(12) United States Patent
Fest et al.

(10) Patent No.: US 8,421,003 B2
(45) Date of Patent: Apr. 16, 2013

(54) OPTICAL TRANSCEIVER BUILT-IN TEST (BIT)

(75) Inventors: Eric C. Fest, Tucson, AZ (US); James P. Mills, Austin, TX (US); Nicholas D. Trail, Tucson, AZ (US); Jim R. Hicks, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 543 days.

(21) Appl. No.: 12/771,878

(22) Filed: Apr. 30, 2010

(65) Prior Publication Data
US 2011/0268453 A1  Nov. 3, 2011

(51) Int. Cl.
  *G01D 18/00* (2006.01)
(52) U.S. Cl.
  USPC .................................. 250/252.1; 250/339.11
(58) Field of Classification Search ............... 250/252.1, 250/339.11
  See application file for complete search history.

(56) References Cited

U.S. PATENT DOCUMENTS

| 3,989,947 A | 11/1976 | Chapman |
| 4,544,843 A | 10/1985 | Kern et al. |
| 7,081,614 B2 * | 7/2006 | Duncan et al. ............. 250/252.1 |
| 7,304,296 B2 | 12/2007 | Mills |
| 7,355,179 B1 * | 4/2008 | Wood et al. ............. 250/339.11 |
| 7,378,626 B2 | 5/2008 | Fetterly |
| 2005/0168720 A1 | 8/2005 | Yamashita et al. |
| 2011/0084195 A1 * | 4/2011 | Schaub et al. ............. 250/203.2 |

FOREIGN PATENT DOCUMENTS

| DE | 3020996 A1 | 12/1981 |
| JP | 59-145982 A | 8/1984 |
| JP | 2006349449 A | 12/2006 |

* cited by examiner

*Primary Examiner* — Christine Sung
(74) *Attorney, Agent, or Firm* — Eric A. Gifford (57) ABSTRACT

An optical transceiver is provided with a light pipe that intercepts, offsets and redirects a portion of the collimated transmit beam to create a virtual object in the receiver field-of-view to perform the BIT. The light pipe comprises an input face and first reflective surface in the transmitter FOV to intercept a portion of the beam along a first axis and re-direct the beam, a second reflective surface and output face in the receiver FOV that re-directs the portion of the beam along a second axis towards the receiver to create the virtual object in the receiver FOV and an optical channel that guides the redirected portion of the beam from the first reflective surface to the second reflective surface to offset the second axis from the first axis. The same detector used during normal operation of the transceiver is used to perform the BIT, which may include a simple "on/off" test or a radiometry test. The light pipe may be designed with an acceptance FOV that preserves collimation, which facilitates a measurement of alignment error between the transmit beam and receiver.

29 Claims, 11 Drawing Sheets

OPTICAL TRANSCEIVER BUILT-IN TEST (BIT)

BACKGROUND OF THE INVENTION

1. Field of the Invention

This invention relates to a system and method for performance of a Built-In Test (BIT) for an optical transceiver in which a transmitter emits a collimated optical beam and a receiver detects optical radiation in fields of view that overlap at a target.

2. Description of the Related Art

An optical transceiver includes both a transmitter and a receiver on the same platform. The transmitter emits an optical beam within a field-of-view (FOV) and the receiver detects optical radiation within a field-of-view (FOV). The optical transmit beam has a center wavelength from the UV band of approximately 0.3 microns to the LWIR band of approximately 12 microns. The transmit beam is "collimated" if the RMS deviation of its wavefront from a perfect plane wave is less than or equal to ¼ wavelength, preferably ¹⁄₁₀ wavelength or less. The transmit beam is often polarized but may be unpolarized. For example, laser sources are typically linearly polarized. The receiver may comprise a single detection element, a quad-detector or a large array of detection elements and may be imaging or non-imaging. The transmitter and receiver are aligned, either co-boresighted or boresight offset, so that their fields of view overlap at a target range. The transmitter and receiver may be fixed or gimbaled to slew over a field-of-regard (FOR).

The transmitter and receiver may operate in tandem or independently. The transmit beam may "paint" the target to produce a return that is detected by the receiver. The return signature may be processed to, for example, acquire the target, determining a bearing or range to target, identify the target, select an aimpoint on the target etc. Examples include LIDAR systems, active optical target detection (AOTD), active seeker and a laser range finder. Alternately, the receiver may detect a passive signature emitted by the target to acquire and track the target. For example, the receiver may detect the IR heat signature of a missile. The transmit beam illuminates the target to, for example, jam the missile seeker. Examples include a directed infrared countermeasures (DIRCM) system for military or commercial aircraft.

A Built-In Test (BIT) is used to ensure the operability of the optical transceiver. The current state-of-the-art is to simply detect the flash produced by backscatter of the transmit beam off of the transmitter optics. If a flash is detected the transmit source is deemed to be operational. Typically, a separate BIT detector is used to detect the "flash". In a gimballed co-boresighted DIRCM system such as Northrop Gruman's AN/AAQ-24(V) Nemesis, the "eye" can rotate a full 180 degrees. This is done primarily for storage to protect the optics but may also be used to perform a BIT. The eye is rotated 180 degrees so that the transmit beam is directed straight back into the detector. If the detector is on-gimbal, a separate BIT detector may be positioned to detect the transmit beam.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides for a BIT that supports more robust tests of transceiver operability applicable to a wide range of optical transceiver configurations in which the transmit and detection bands overlap.

This is accomplished with a light pipe that intercepts, offsets and redirects a portion of the collimated transmit beam to create a virtual object in the receiver field-of-view (FOV). The light pipe comprises an input face and first reflective surface in the transmitter FOV to intercept a portion of the beam along a first axis and re-direct the beam, a second reflective surface and output face in the receiver FOV that re-directs the portion of the beam along a second axis towards the receiver to create the virtual object in the receiver FOV and an optical channel that guides the redirected portion of the beam from the first reflective surface to the second reflective surface to offset the second axis from the first axis. The same detector used during normal operation of the transceiver is used to perform the BIT, which may include a simple "on/off" test or a radiometry test (transmit beam power). The light pipe may be designed with an acceptance FOV that preserves collimation, which facilitates a measurement of alignment error between the transmit beam and receiver.

In other embodiments, the light pipe may be positioned where the transmitter and receiver fields of view do not overlap. This may be done out of necessity or to reduce scattering and crosstalk. The light pipe, and particularly the first and second reflective surfaces may be total internal reflection (TIR) surfaces to improve efficiency. A diffuser such as a microlens array may be formed on the output face to homogenize the beam to increase the size, and possibly shape, the virtual object in the receiver FOV. The light pipe may comprise a pair of Amici roof prisms separated by the optical channel to eliminate one degree of freedom in aligning the light pipe.

In another embodiment the light pipe may be used to "sample" the collimated transmit beam. The beam may be sampled in extent, time or amplitude or combinations thereof. The beam may be sampled in extent by positioning the light pipe to intercept only a portion of the beam (e.g. 5% or less). The beam may be sampled in time using a translation stage to move the light pipe in and out of the fields of view, an electro-optic switch to selective transmit or reflect light through the pipe or by slewing a gimbaled transceiver to the edge of its field of regard (FOR) to direct the transmit beam through the light pipe. The beam may be sampled in amplitude by configuring the light pipe to only intercept a fraction of the optical power of the beam passing there through.

In another embodiment the light pipe is used in conjunction with an optical transceiver configured as a directed infrared counter measures (DIRCM) system that tracks a hostile threat using a passive detector and jams the threat's IR seeker using a modulated laser beam. The optical transceiver comprises a roll/node gimbal that rotates about roll and nod axes to point an optical axis over a field-of-regard (FOR) in a multi-dimensional space. Receiver optics on the roll/nod gimbal receives optical radiation in a receiver FOV along the optical axis. A detector is optically coupled to the receiver optics to detect passive IR radiation. Transmitter optics on the roll/nod gimbal are offset from the optical axis but nominally aligned with the line-of-sight of the optical receiver. The transmitter optics are optically coupled to an IR laser to transmit the optical beam collimated to one-quarter wave or less that diverges in a transmitter FOV. A light pipe, suitably TIR, is fixed to a platform near the edge of the FOR. The roll/nod gimbal is responsive to a built-in-test (BIT) request to slew the optical axis to the edge of the FOR so that the light pipe intercepts a portion of the beam and re-directs it to create a virtual object in the receiver FOV. The light pipe suitably has an acceptance FOV that maintains the collimation of the beam as it passes there through and a diffuser at an output face that homogenizes the beam to increase the size of the virtual object in the receiver FOV. A processor ordinarily processes a signal generated by the detector to track the target and controls the laser to modulate the IR beam to jam an IR seeker on the target. The processor initiates the BIT request to slew the gimbal and processes a signal generated by the receiver in response to the virtual object to perform a built-in test (BIT) on the transceiver including a measurement of the beam power and a measurement of an alignment error of the transmit beam to the receiver FOV.

These and other features and advantages of the invention will be apparent to those skilled in the art from the following detailed description of preferred embodiments, taken together with the accompanying drawings, in which:

DETAILED DESCRIPTION OF THE INVENTION

The present invention describes a BIT that supports more robust tests of transceiver operability applicable to a wide range of optical transceiver configurations in which the transmit and detection bands overlap. This is accomplished with a light pipe that intercepts, offsets and redirects a portion of the collimated transmit beam to create a virtual object in the receiver field-of-view.

The optical transceiver includes both a transmitter (source and transmitter optics) and a receiver (detector and receiver optics) on the same platform. The transmitter emits an optical beam within a FOV and the receiver detects optical radiation within a FOV. The optical transmit beam has a center wavelength in a range that may span the UV band of approximately 0.3 microns to the LWIR band of approximately 12 microns. The transmit beam is "collimated" having an RMS deviation of its wavefront from a perfect plane wave of less than or equal to ¼ wavelength, preferably ⅒ wavelength or less. The transmit beam is often polarized but may be unpolarized. For example, laser sources are typically linearly polarized. The receiver may comprise a single detection element, a quad-detector or a large array of detection elements and may be imaging or non-imaging. The detection band overlaps the center wavelength of the transmit beam. The transmitter and receiver are aligned, either co-boresighted or boresight offset, so that their fields of view overlap at a target range. The transmitter and receiver may be fixed or gimbaled to slew over a field-of-regard (FOR). Examples of optical transceivers include but are not limited to LIDAR systems, active optical target detection (AOTD), active seeker, a laser range finder and a directed infrared countermeasures (DIRCM) system.

Figure 1:
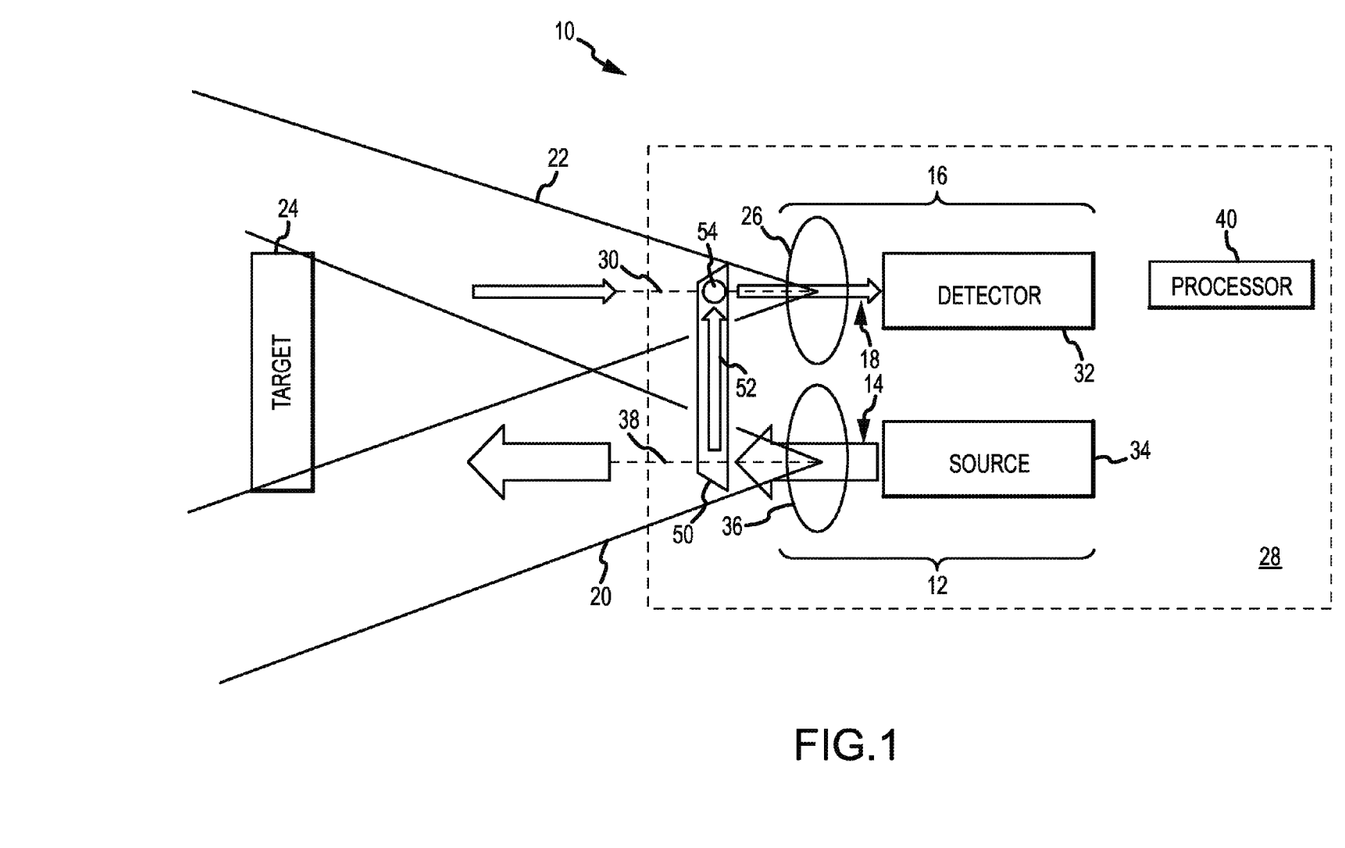
FIG. 1 is a diagram of an offset boresight optical transceiver having a light pipe to sample the transmit beam to create a virtual object in the receiver FOV to perform a BIT.

In an embodiment as shown in FIG. 1, a boresight offset optical transceiver 10 comprises a transmitter 12 that emits a collimated optical beam 14 and a receiver 16 detects optical radiation 18 in fields of view 20 and 22 that overlap at a target 24. The detected optical radiation 18 may or may not be a return signature of the transmit beam 14 reflected off the target. Receiver 16 comprises receiver optics 26 on a platform 28 that receive optical radiation 18 in receiver FOV 22 along an optical axis 30 and a detector 32 optically coupled to the receiver optics. Transmitter 12 comprises a source 34 (e.g. a laser or laser diode) that emits collimated optical beam 14 and transmitter optics 36 on platform 28 that transmit beam 14 in transmit FOV 20 along an optical axis 38 offset from optical axis 30 (hence the term "boresight offset") but nominally aligned with the line-of-sight of receiver 16. The transmitter and receiver may be body-fixed to the platform or gimbaled to slew the fields of view over a FOR. The source and detector may be on or off gimbal. A processor 40 processes signals from detector 32 to characterize target 24 during normal tactical operations of the transceiver. For example, processor 40 may process signals to determine a bearing to the target and issue guidance signals, determine a range to target, determine a target image to perform target identification or aim-point selection.

In accordance with an embodiment of the present invention, a light pipe 50 is positioned in the optical path to intercept a portion of collimated transmit beam 14 in the transmit FOV 20 and offsets and redirects a portion 52 of the collimated transmit beam to create a virtual object 54 in the receiver FOV 22. Processor 40 processes a signal or signals generated by detector 32 in response to the virtual object to perform one or more built-in tests (BIT) on the transceiver. Processor 40 may perform a simple "of/off" test to confirm that the source is emitting beam 14, may perform a radiometry test to measure the power of beam 14 and may perform a boresight verification test to measure alignment error beam the beam 14 and the receiver. Boresight verification requires the angle information in the beam 14 must be preserved. The light pipe may be engineered to have an acceptance angle that preserves beam collimation, hence the angle information.

This approach uses the same detector and electronics as used for normal tactical operations. Light pipe 50 is suitably positioned at the output of the transmitter optics and the input of the receiver optics (sans any dome or optical window) to provide an "end-to-end" BIT of the transceiver. Alternately, the light pipe may be positioned at an intermediate position within the optics. The light pipe 50 is suitably located at a position on the platform that the transmit FOV 20 and receiver FOV 22 do not overlap. This reduces crosstalk between the transmitter and receiver.

Light pipe 50 "samples" a portion 52 of collimated transmit beam 14. The beam may be sampled in extent, time or amplitude or combinations thereof. The light pipe may be fixed relative to the optical system to intercept the portion 52 of the beam. The portion may, for example, be less than 5% of the beam depending on beam power and other factors. The light pipe may continuously sample the beam to provide a signal the processor may continuously, periodically or as desired process to form the BIT. The light pipe may be electro-optically switched in response to a BIT request from the processor to intercept and redirect light to the detector. The light pipe may be selectively moved in and out of the fields of view to perform the BIT by, for example, translating the light pipe or swinging the gimbaled optics to engage the light pipe.

Figure 2A:
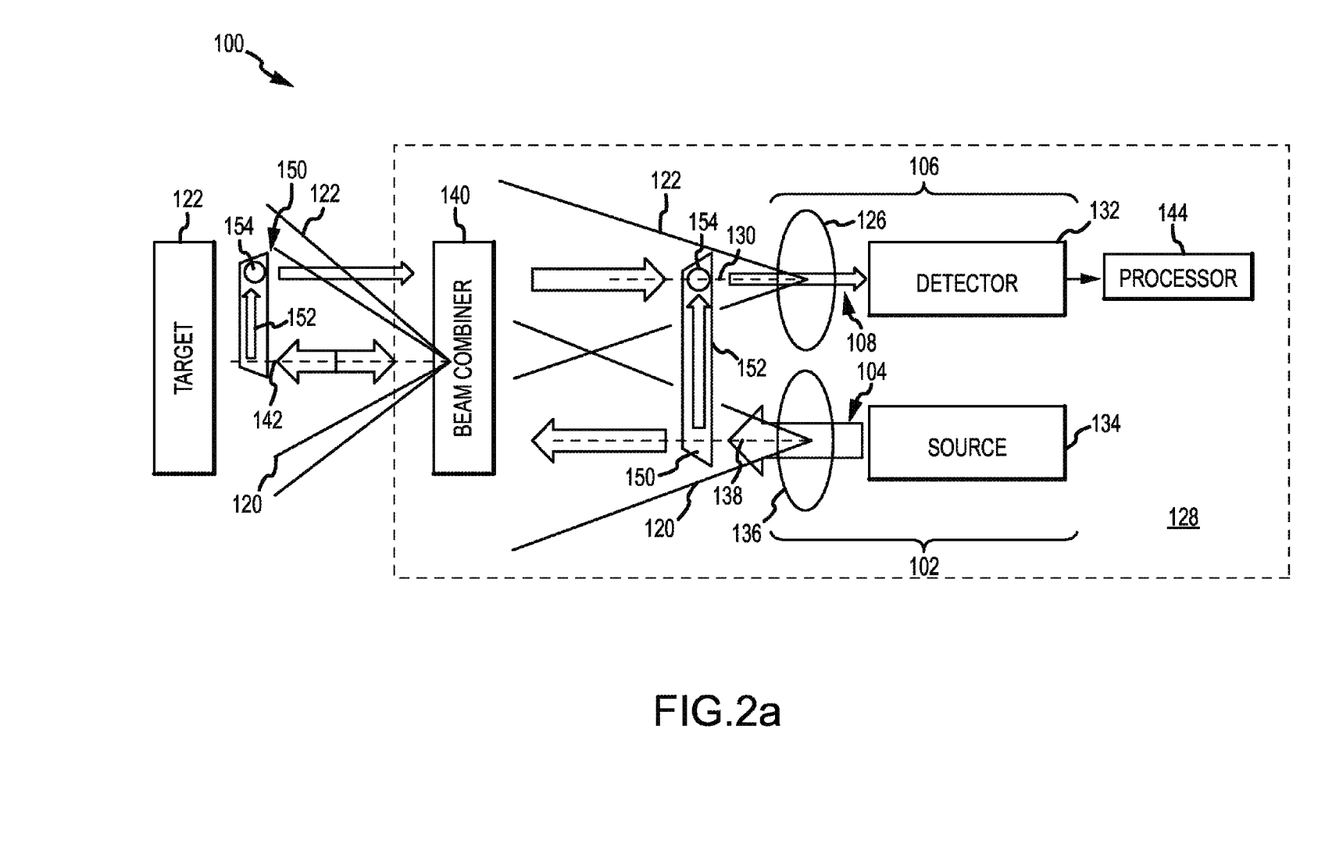
FIGS. 2a and 2b are diagrams of a co-boresighted optical transceiver having a light pipe to sample the transmit beam to create a virtual object in the receiver FOV to perform a BIT.
Figure 2B:
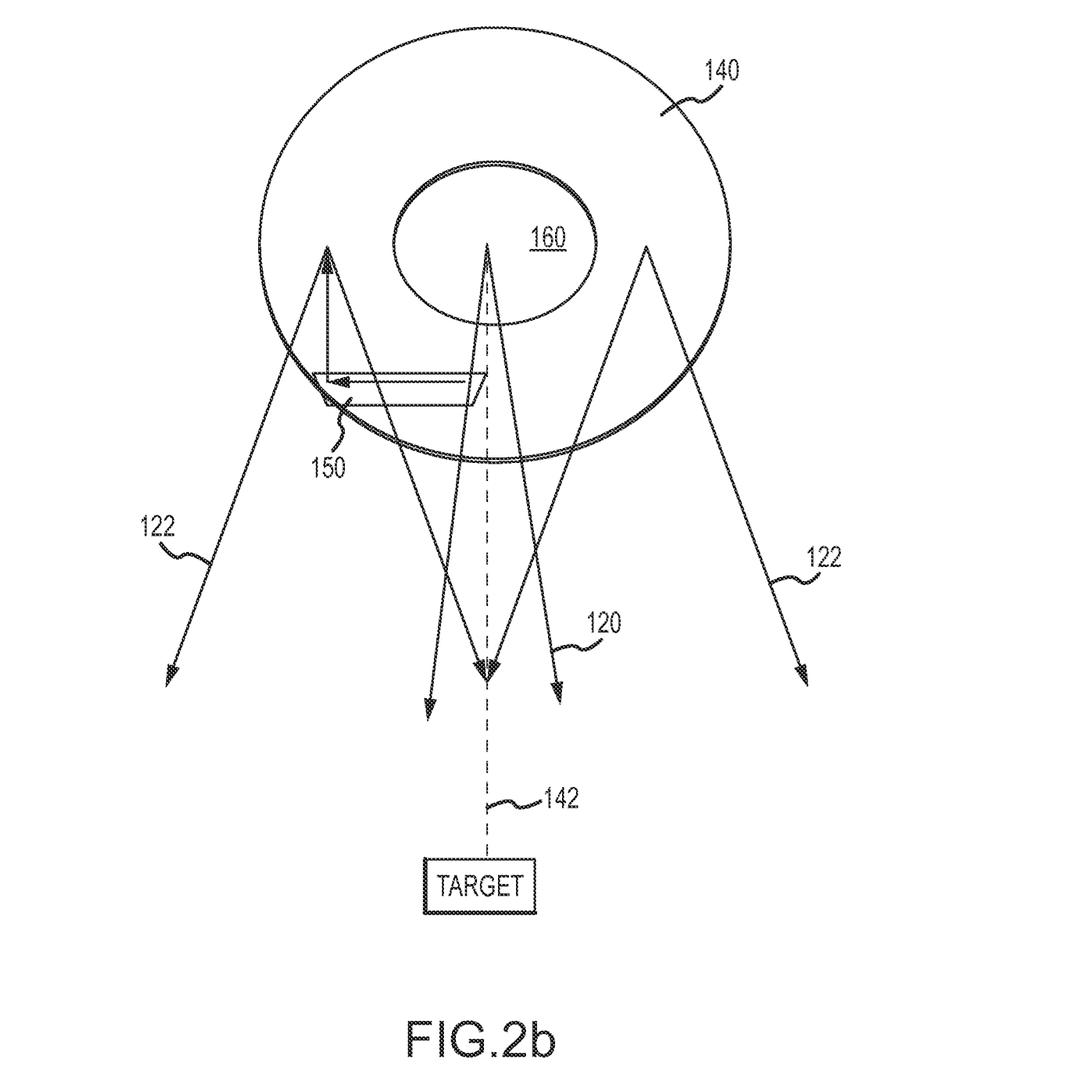

In an embodiment as shown in FIGS. 2a and 2b, a co-boresighted optical transceiver 100 comprises a transmitter 102 that emits a collimated optical beam 104 and a receiver 106 detects optical radiation 108 in fields of view 120 and 122 that overlap at a target 124. The detected optical radiation 108 may or may not be a return signature of the transmit beam 104 reflected off the target. Receiver 106 comprises receiver optics 126 on a platform 128 that receive optical radiation 108 in receiver FOV 122 along an optical axis 130 and a detector 132 optically coupled to the receiver optics. Transmitter 112 comprises a source 134 (e.g. a laser or laser diode) that emits collimated optical beam 104 and transmitter optics 136 on platform 128 that transmit beam 104 in transmit FOV 120 along an optical axis 138 offset from optical axis 130. A beam combiner 140 combines the fields of view such that they are both aligned along the same boresight axis 142 (hence the term "co-boresighted"). The transmitter, receiver and beam combiner may be body-fixed to the platform or gimbaled to slew the fields of view over a FOR. The source and detector may be on or off gimbal. A processor 130 processes signals from detector 132 to characterize target 124 during normal tactical operations of the transceiver. For example, processor 144 may process signals to determine a bearing to the target and issue guidance signals, determine a range to target, determine a target image to perform target identification or aim-point selection. In accordance with an embodiment of the present invention, a light pipe 150 is positioned in the optical path to intercept a portion of collimated transmit beam 104 in the transmit FOV 120 and offset and redirect a portion 152 of the collimated transmit beam to create a virtual object 154 in the receiver FOV 122. Processor 140 processes a signal or signals generated by detector 32 in response to the virtual object to perform one or more built-in tests (BIT) on the transceiver.

As shown in FIG. 2a, light pipe 150 may be positioned between the receiver and transmitter optics and the beam combiner where the fields of view do not overlap or may be positioned at the output of the beam combiner where the fields of view may overlap.

As shown in FIG. 2b, an embodiment of beam combiner 140 produces a 'dead spot' 160 in the receiver FOV at the image plane. This may for example occur if the beam combiner is implemented as a beam splitter with a hole in the center—the transmit beam from the transmitter optics goes through the hole and receive radiation gets reflected by the beamsplitting surface to the receiver optics The transmit FOV 120 is a cone that lies along the boresight axis 142. The receive FOV 122 is a cone that is offset from the boresight axis 142 in an annular region around the hole in the beam combiner. At the plane of the beam combiner and for some distance the transmitter and receiver fields of view do not overlap. Light pipe 150 intercepts the collimated transmit beam in the transmit FOV and offsets and redirects the beam to create the virtual object in the receiver FOV. In other embodiments of the beam combiner there may not be a dead spot. The light pipe is still used to intercept and redirect light although there may be a measure of cross talk between the transmitter and receiver.

Figure 3A:
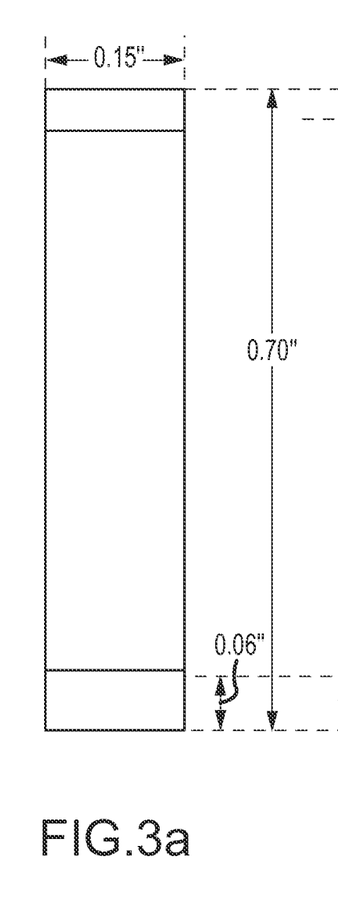
FIGS. 3a and 3b are front and side views of an embodiment of a light pipe.
Figure 3B:
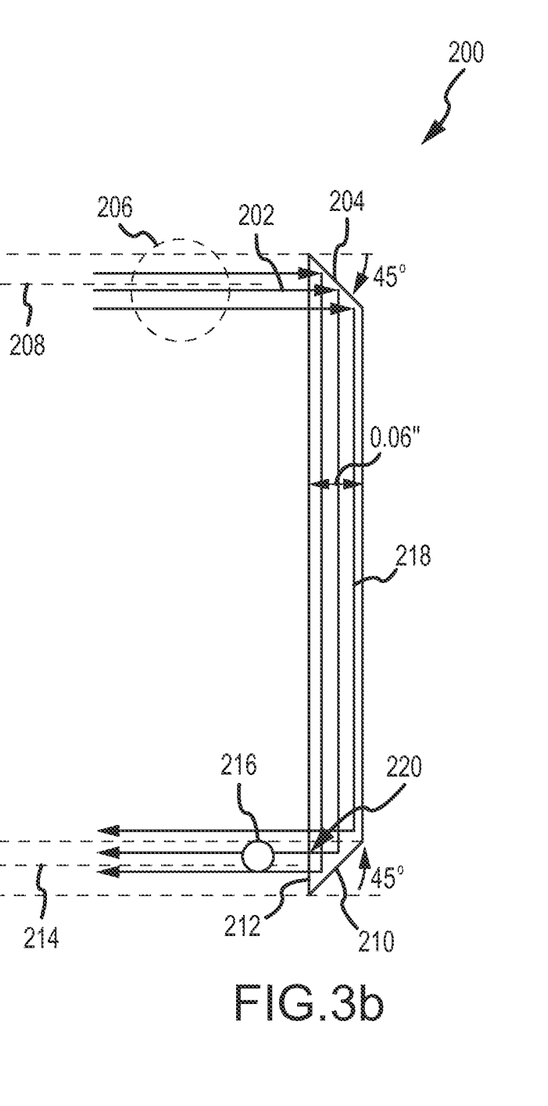

An embodiment of a light pipe 200 is illustrated in FIGS. 3a and 3b. Light pipe 200 comprises an input face 202 and a first reflective surface 204 in the transmitter FOV to intercept a portion 206 of a collimated transmit beam along a first axis 208 and re-direct the beam portion, a second reflective surface 210 and an output face 212 in the receiver FOV that re-directs the beam portion 206 along a second axis 214 towards the receiver to create a virtual object 216 in the receiver FOV and an optical channel 218 that guides the redirected beam portion 206 from the first reflective surface to the second reflective surface to offset the second axis 214 from the first axis 208. For purposes of example only, in this specific embodiment the light pipe is 0.70" in length, 0.15" wide, 0.06" thick and the reflective surfaces are formed at 45 degrees to the axis. The light pipe is suitably an integral optical element.

The light pipe may be configured such that the beam portion 206 incident on input face 202 undergoes total internal reflection (TIR) until leaving output face 212. This improves efficiency and the accuracy of the radiometry test. TIR also preserves the collimation of the beam (i.e. does not alter its natural divergence), which is needed to extract angle information from the beam to perform the boresight verification test. To ensure TIR through the entire light pipe the angle of incidence of the beam on the reflective surfaces must exceed the critical angle (set by the material the light pipe is formed from) and the acceptance angle of the light pipe must be large enough that the beam does not hit the sides of the optical channel as it pass through. The first condition is satisfied by suitably selecting by using a material having a critical angle less than 45 degrees. This material should also be substantially transparent to the wavelengths of interest and athermal. For example, for IR applications the light pipe may be formed from Zinc Selenide (ZnSe). The second condition is satisfied by making the optical channel sufficiently thick.

Figure 4:
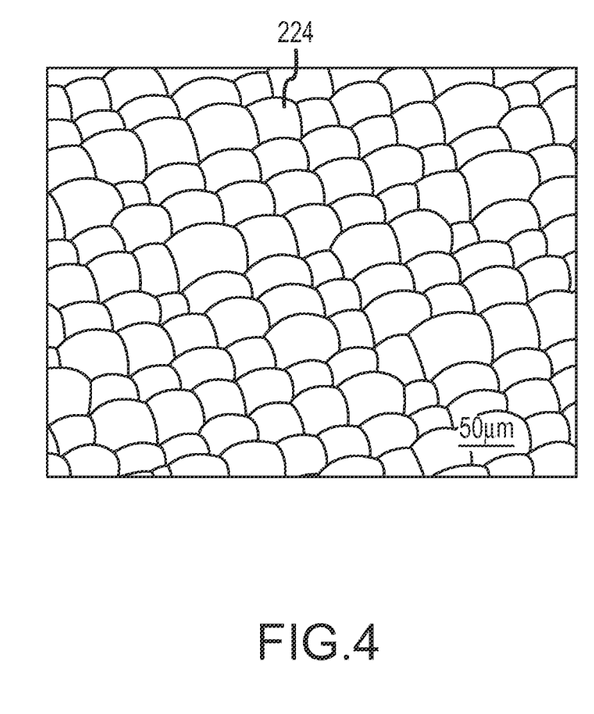
FIG. 4 is a diagram of a microlens diffuser for homogenizing the beam at the output face to increase the size of the virtual object.
Figure 5:
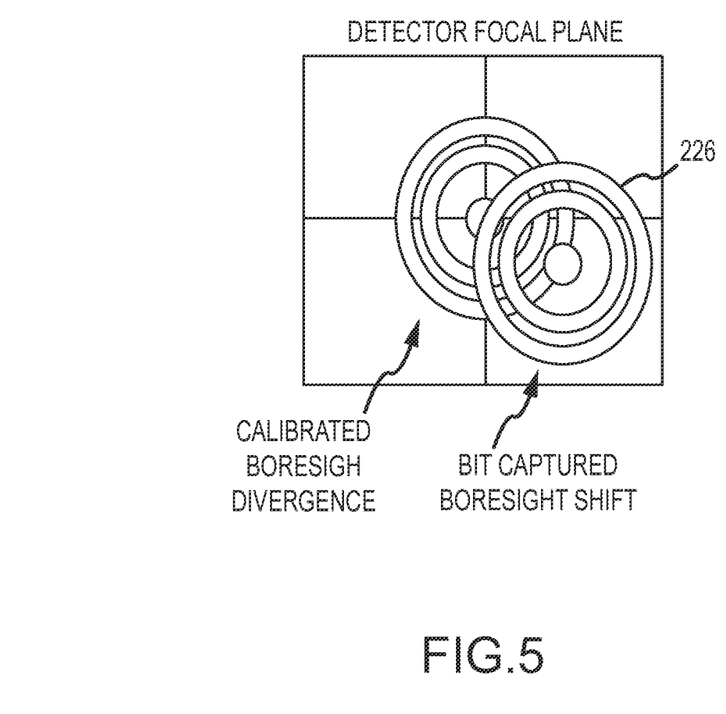
FIG. 5 is a diagram of an engineered spot using the microlens diffuser.

The light pipe may be configured with a diffuser 220 on output face 212 that homogenizes the beam to increase the size of the virtual object in the receiver FOV. One approach is to grind the output face so that light is scattered uniformly into a hemisphere (i.e. a Lambertian surface). This reduces the amount of flux on the detector but is insensitive to alignment errors. Another approach is to form a structured microlens array 224 as shown in FIG. 4 as a light-shaping diffuser on the output face to scatter light into a cone of a desired angle. This increases the flux on the detector but is more sensitive to alignment errors. As shown in FIG. 5, the microlens array can be structured to produce a specific pattern 226 at the detector focal plane. Provided beam collimation is preserved, this type of pattern facilitates measurements of alignment errors between the calibrated boresight divergence and the BIT captured boresight shift. For example, in this case the detector is a quad-detector that generates four signals based on the position of the spot (radiation reflected off the target) to compute the bearing to the target. It is important to know (and measure) any alignment error from the calibrated state to compensate the bearing calculation. The circular pattern shown as an example simplifies the computation of the alignment error. Structured microlens arrays to achieve beam shaping are commercially available from RPC Photonics, Inc. Details are provided in Tasso R. M. Sales "Structured Microlens Arrays for Beam Shaping" Proceedings of SPIE Vol. 5175 Laser Beam Shaping IV, 2003, pp 109 to 120, which is hereby incorporated by reference.

Figure 6A:
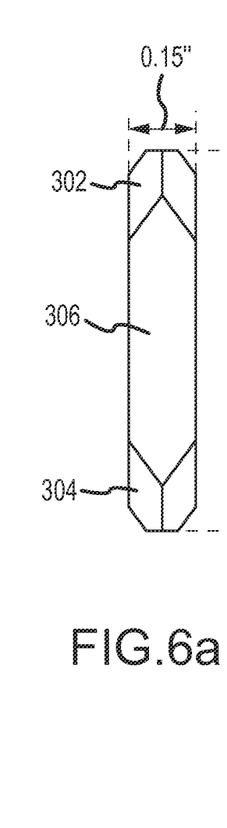
FIGS. 6a through 6c are front, side and perspective views of another embodiment of a light pipe comprising a pair of Amici prisms separated by an optical channel.
Figure 6B:
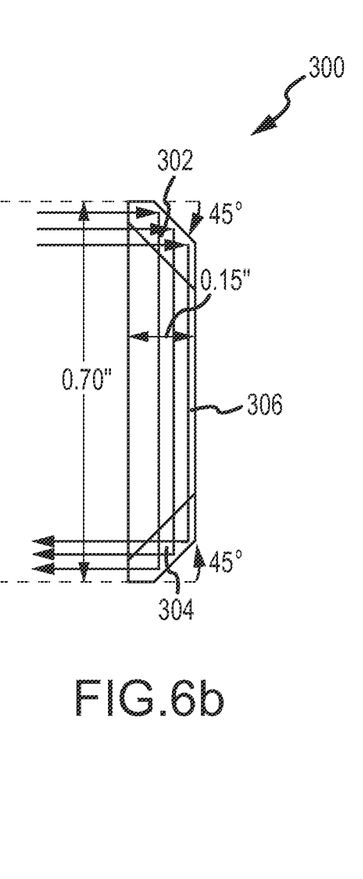
Figure 6C:
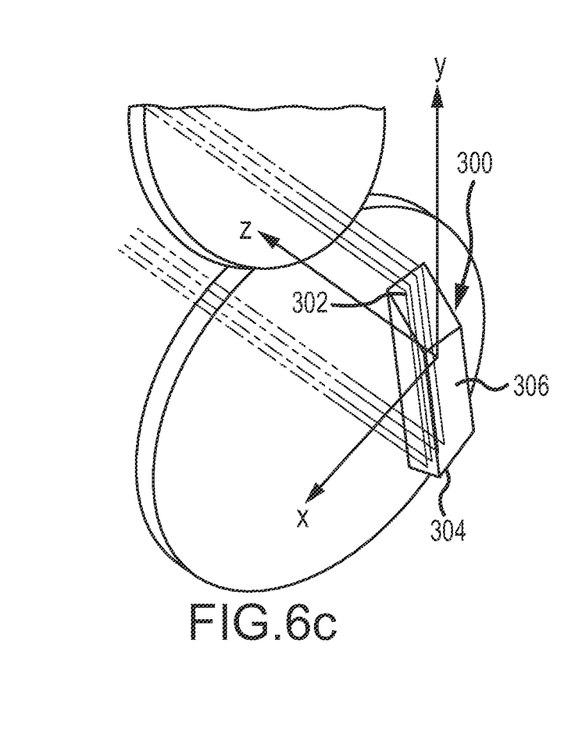

Another embodiment of a light pipe 300 is illustrated in FIGS. 6a through 6c in which the light pipe comprises a pair of Amici roof prisms 302 and 304 separated by an optical channel 306. An Amici roof prism, named for its inventor, the Italian astronomer Giovanni Amici, is a type of reflecting prism used to deviate a beam of light by 90° while simultaneously inverting the image. It is commonly used in the eyepieces of telescopes as an image erecting system. The device is shaped like a standard right-angled prism with an additional "roof" section (consisting of two faces meeting at a 90° angle) on the longest side. Total internal reflection from the roof section flips the image laterally. The handedness of the image is unchanged. The roof faces of the prism are sometimes coated to provide mirror surfaces. This allows the prism to be used with a wider range of beam entrance angles without being limited by total internal reflection. The use of the Amici roof prisms eliminates alignment sensitivity of the light pipe around the x-axis. For the example given previously, the Amici roof prism design is over twice as thick, 0.15" to 0.06". This light pipe is suitably a single integral element, TIR and may be formed with a diffuser at its output face.

The light pipe may be used to "sample" the collimated transmit beam. The beam may be sampled in extent, time or amplitude or combinations thereof. The beam may be sampled in extent by positioning the light pipe to intercept only a portion of the beam (e.g. 5% or less). The beam may be sampled in time using a translation stage to move the light pipe in and out of the fields of view, an electro-optic switch to selective transmit or reflect light through the pipe or by slewing a gimbaled transceiver to the edge of its field of regard (FOR) to direct the transmit beam through the light pipe. The beam may be sampled in amplitude by configuring the light pipe to only intercept a fraction of the optical power of the beam passing there through.

Figure 7:
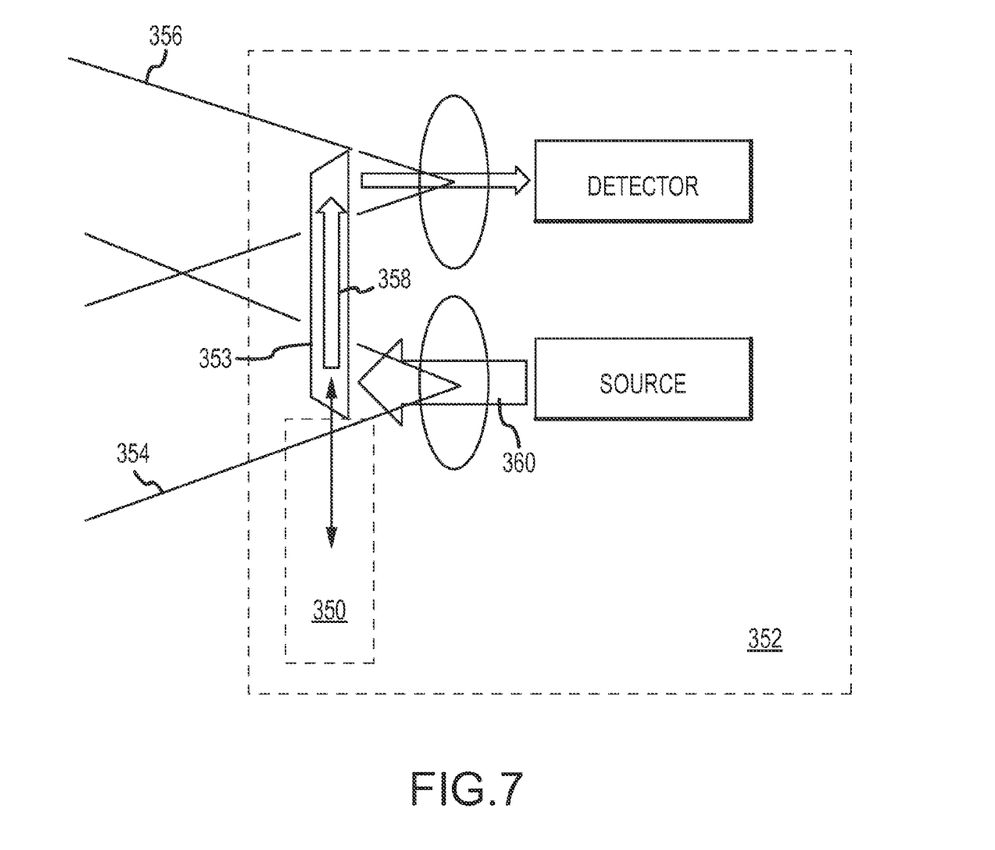
FIG. 7 is a diagram of a portion of the optical receiver including a translation stage for moving the light pipe in and out of the optical path to perform the BIT.

In an embodiment shown in FIG. 7, a translation stage 350 is mounted on platform 352 and configured to hold a light pipe 353 outside the transmitter and receiver fields of view 354 and 356 during normal operations of the optical transceiver. In response to a request to perform a BIT, the translation stage 350 positions light pipe 352 in the fields of view 354 and 356 to intercept a portion 358 of a collimated transmit beam 360 redirect and offset the beam portion 358 to create a virtual object in the receiver FOV. Once the BIT is complete, translation stage 350 withdraws the light pipe.

Figure 8:
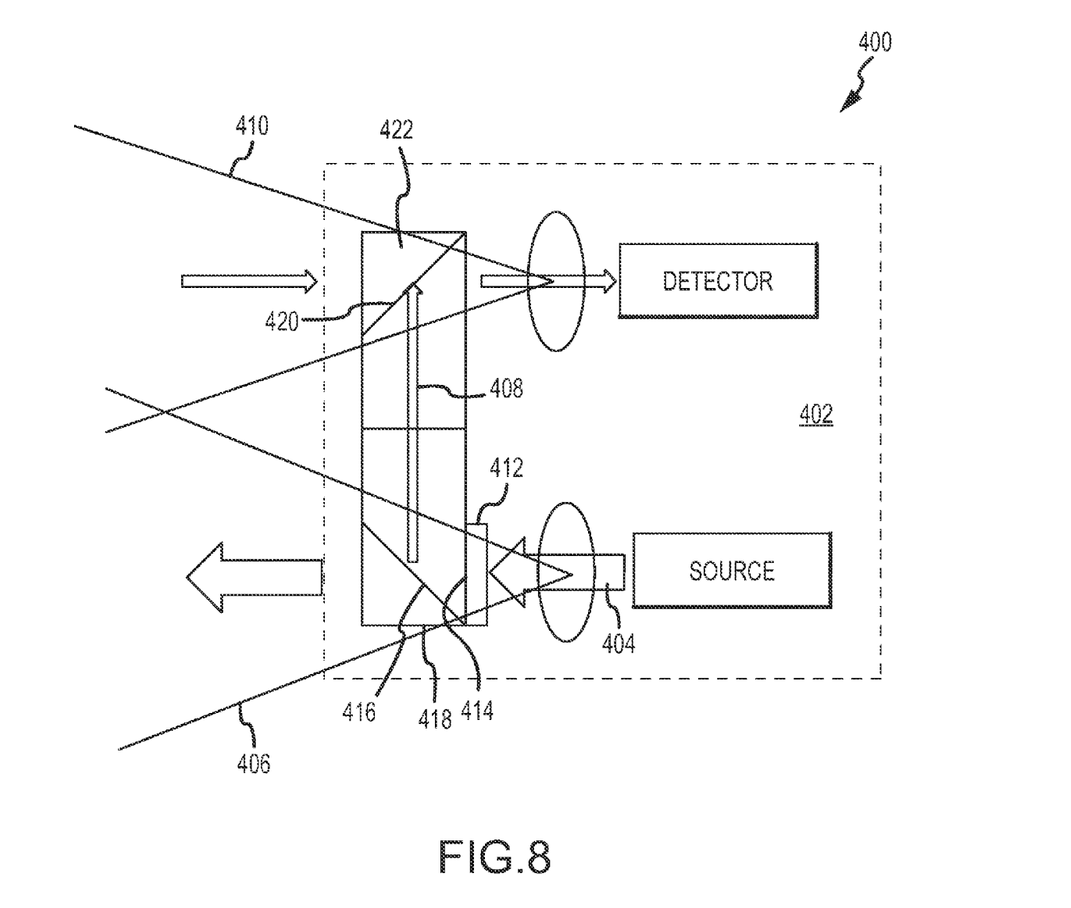
FIG. 8 is a diagram of a portion of the optical transceiver including an electro-optical (EO) switch integrated with the light pipe to sample the transmit beam to perform the BIT.

In an embodiment shown in FIG. 8, a light pipe 400 is positioned on platform 402 to intercept a portion of a collimated beam 404 having a first polarization in transmit FOV 406 and redirect beam portion 408 to create a virtual object in receiver FOV 410. An electro-optic switch comprises an EO modulator 412 on input face 414 and a polarizing beamsplitter (PBS) 416 that provides a first reflective surface 418 that transmits light having the first polarization and reflects light having a second polarization. During ordinary tactical operations, the EO switch suitably does not alter the polarization state of the collimated beam allowing it to pass through the PBS and remain as part of the transmit beam. During a BIT, the EO switch alters the polarization of the collimated beam to the second polarization causing it to reflect off the PBS to a second reflective surface 420. For example, laser sources are linearly polarized; the electric field of the beam oscillates along a particular axis perpendicular to the beam. An EO modulator may rotate the axis of rotation 90 degrees so that the output is still linearly polarized but rotated 90 degrees. Second reflective surface 420 may be a TIR surface or may comprise another PBS 422 that is configured to pass light having the first polarization and reflect light having the second polarization. During a BIT, the beam portion is reflected to the receiver. During normal tactical operations, if the polarized collimated beam is reflected off the target the return signature will have approximately the first polarization and largely pass through the PBS. If the receiver is configured to detect passive radiation approximately half of the radiation will pass through the PBS.

Figure 9A:
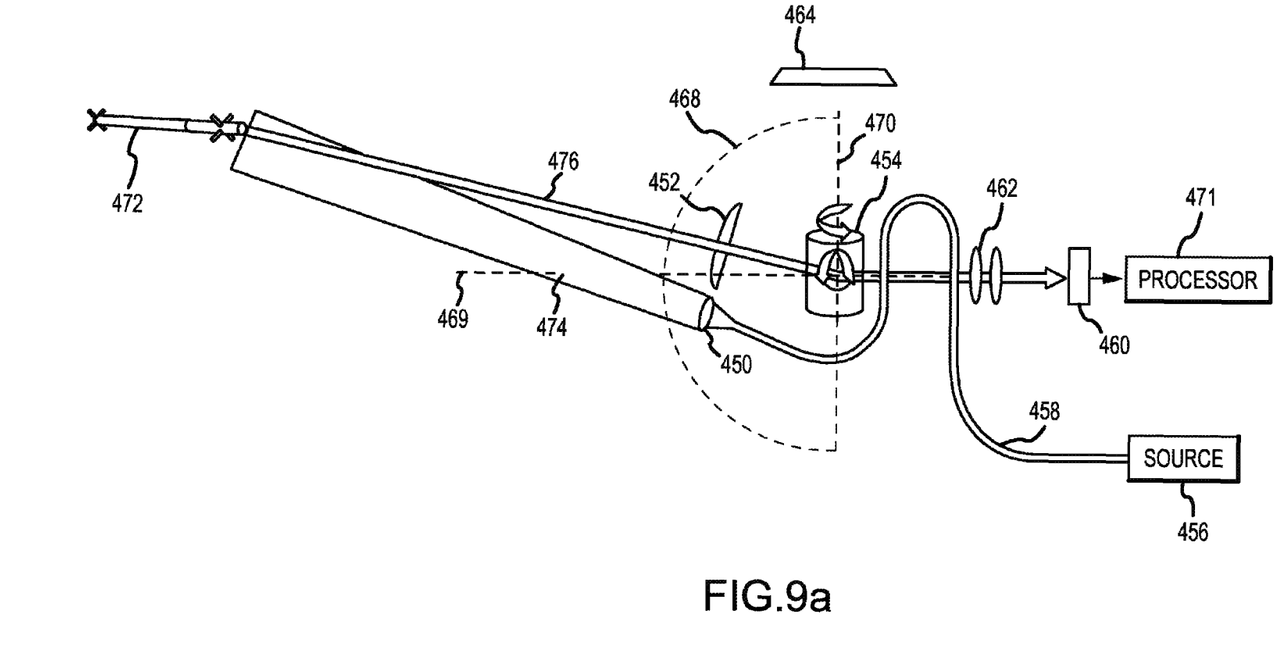
FIGS. 9a and 9b are diagrams of a gimbaled offset-boresight optical transceiver in which the gimbal is slewed to the edge of the field-of-regard (FOR) to direct the transmit beam through the light pipe to perform the BIT.
Figure 9B:
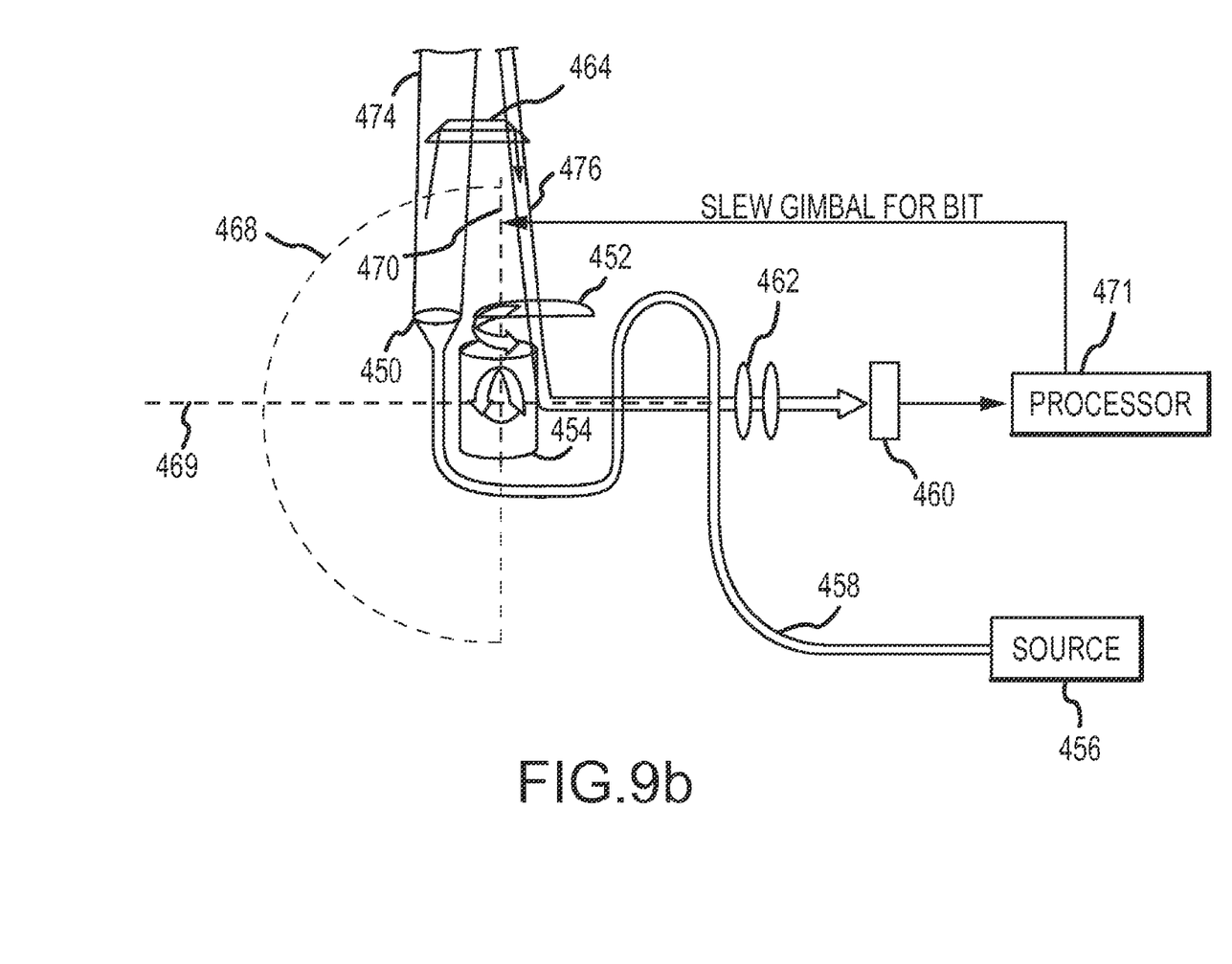

In an embodiment of an optical transceiver shown in FIGS. 9a and 9b, the transmitter optics 450 and receiver optics 452 are mounted on a roll/nod gimbal 454 in a boresight offset configuration. Transmitter optics 450 is optically coupled to an off-gimbal source 456 via an optical fiber assembly 458. Receiver optics 452 is optically coupled to an off-gimbal detector 460 via additional optics 462. The source (e.g. a laser) and detector could be mounted on gimbal. An off-gimbal light pipe 464 is fixed to a platform (not shown) on which the roll/node gimbal is mounted. The light pipe 464 is suitably positioned at the edge of a field of regard (FOR) 468. During normal tactical operations, the roll/nod gimbal slews about roll axis 469 and nod axis 470 over FOR 468 in response to signals from a processor 471 to, for example, track a target 472. To conduct a BIT, processor 470 generates a signal to slew the gimbal to the edge of FOR 468. A portion of a collimated transmit beam 474 is intercepted by light pipe 464 offset and re-directed to form a virtual object in the receiver FOV 476. Positioning the light pipe at the edge of the FOR simplifies alignment of the transmit beam to the light pipe; the gimbal simply slews as far as it can and stops in alignment with the light pipe. This gimbal configuration may be used for a DIRCM system.

Figure 10A:
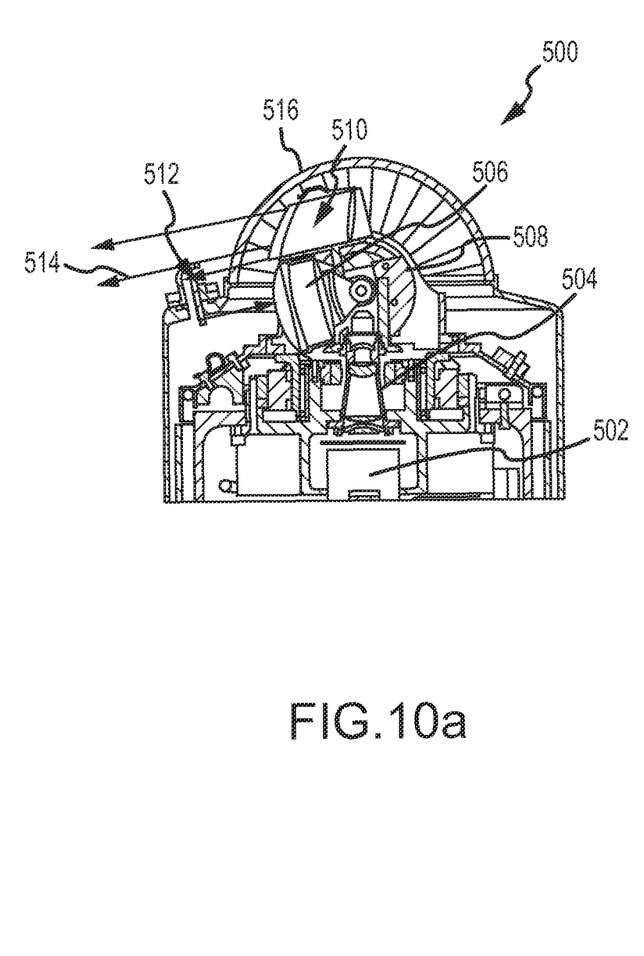
FIGS. 10a and 10b are diagrams of a directed infrared countermeasures (DIRCM) optical transceiver to track a missile and jam the missile's IR seeker in which the light pipe is mounted outside and inside the dome, respectively.
Figure 10B:
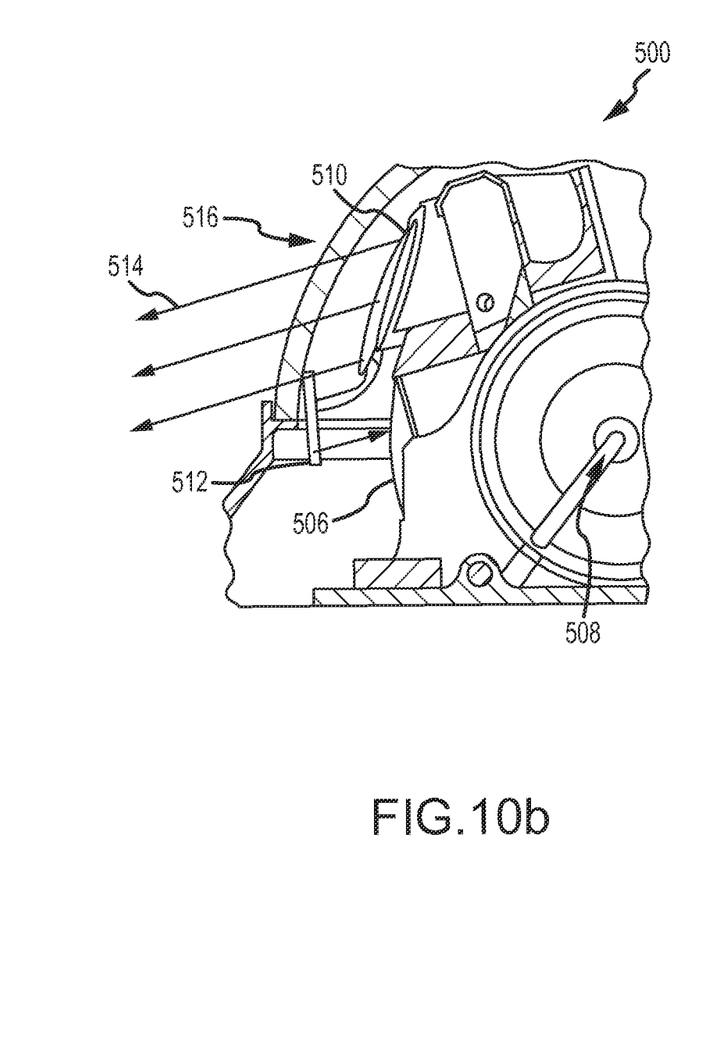

Although generally applicable in any optical transceiver in which the detector is responsive to the transmit band, the light pipe is particularly well suited for a roll-nod pointer 500 for use in DIRCM systems as shown in FIGS. 10a and 10b. An IR detector 502 and its free-space optical path 504 and receiver optics 506 occupy the center of the roll/nod gimbal 508 and the on-axis optical path. A fiber assembly provides a means for routing an off-gimbal laser to an on-gimbal telescope 510 (transmitter optics) that is offset from the optical axis without interacting with the on-axis optical path. A light pipe 512 is fixed at the edge of the seeker's FOR so that it is not in the way during normal tactical operations yet a BIT can be quickly and reliably performed by simply slewing the roll/nod gimbal to the edge of its FOR. A portion of the collimated transmit beam 514 is intercepted, re-directed and offset to create a virtual object in the FOV of the receiver optics 506 The light pipe may be mounted either outside the dome 516 as shown in FIG. 10a or inside the dome as shown in FIG. 10b.

An AIM-9X ("sidewinder") Imaging Seeker typically used as a missile seeker may be modified for use in the DIRCM system to detect, track, verify and jam a threat such as a shoulder launched missile. The AIM-9X Imaging Seeker is a proven product with volume manufacturing capacity, and thus is less expensive than designing and building a roll-nod pointer specifically for the DIRCM system. The seeker's roll/nod gimbal includes all of the mechanical components forward of a bulkhead that articulate in the roll and nod axes. Specifically the gimbal includes a roll gimbal and a nod gimbal, which include a nod rotating bearing assembly, a nod torquer, a roll bearing assembly and a roll torquer, as well as some type of mounting platform. The optical components in the standard AIM-9X seeker head, the additional optical components for transmitting a jam laser beam(s) and the light pipe are mounted on the gimbal platform.

Infrared energy enters receive telescope on nod gimbal over a wide FOV, suitably several degrees, through a dome. Sapphire or ALON are suitable materials for the AIM-9X dome for its scratch resistance and ability to withstand aerodynamic heating experienced during flight. The IR energy is collimated into a beam and travels through a prism and relay and focus optics to a staring Focal Plane Array (FPA) 114 (detector). The prisms and optics are configured in such a way that they enable the seeker's gimbal to articulate in both roll and nod. As the energy in the beam exits the folded telescope it crosses a nod axis, enters the prism and is relayed to where it reaches the sealed bulkhead and crosses a roll axis. Beyond this point the optics and FPA detector are body fixed. Once past the gimbal's roll axis, energy enters a relay and focus optics lens set. This set of optics forms the image on the FPA located at the image plane of the focus optics. Located between the focus optics and FPA is a spinning filter wheel that contains multiple filtering elements that select the spectral band in which the seeker operates. Filter selection is software driven and can change in real-time with the changing engagement by controlling a motor. Spectrally optimized energy is imaged on, for example, a 128 by 128 Indium Antimonide staring FPA and read out by a readout circuit. The FPA is typically cooled by a Cryoengine affording unlimited cooling during the mission.

The bulkhead and the fixed components of the seeker aft of the roll gimbal allow for high Off Boresight Angle (OBA) operation within the traditional 3 inch Sidewinder dome diameter. The roll/nod gimbal configuration provides superior target tracking. The Off-Gimbal Inertial Seeker Assembly allows high slew rates. With the roll/nod gimbal detector off-gimbal there are no cryogenic lines that must cross the gimbals. The reduced on-gimbal mass and minimal spring torque allow the gimbal to be controlled by a high bandwidth control loop that drives the roll/nod torquers enabling very high speed slewing and fast settling times for the seeker.

The Imaging Seeker is modified for use in the DIRCM by outfitting it with the proper laser sources, fiber assembly, fiber control mechanisms and laser transmitters needed to jam the seeker on the inbound missile and a light pipe to perform the BIT. The dome transmits energy from the Ultraviolet through mid-infrared so the DIRCM can transmit laser energy that is in-band to the most advanced multi-color threats that operate in multiple portions of the spectrum including the Ultraviolet. Materials other than Sapphire such as Aluminum OxyNitride (ALON), may also provide the requisite mechanical and transmission properties. Existing and in development DIRCM systems can not operate at wavelengths from the near infrared through the visible and into the ultraviolet due to limits imposed by materials used in their optical systems.

The seeker's nod gimbal is suitably fitted with a multiband infrared conformal optics laser transmitter telescope attached off-axis to and aligned with the line-of-sight of the folded telescope. Details of the conformal optics preferably used herein are provided in copending U.S. patent application Ser. No. 10/909,940 entitled "Windowed Optical System Having A Tilted Optical Element To Correct Aberrations", filed on Dec. 4, 2002 and U.S. Pat. Nos. 6,552,318; 6,313,951; 6,310,730 and 6,028,712, which are hereby incorporated by reference. The threat missile is centered in the track frame, laying the laser transmitter's optical line of sight onto the missile. The optical centerlines of the AIM-9X Imaging Seeker and the laser transmitter are co-aligned. A continuous IR fiber assembly is routed to couple laser telescope to the output of an IR laser.

When directed to fire during normal tactical operations, the IR laser fires an IR laser jam beam that passes through the IR fiber to the telescope where the beam is emitted and transmitted through the dome. The jam beam is aligned with the seeker's line-of-sight on the target and has only a few milliradians of beam divergence. More sophisticated missiles can, once their IR seeker is jammed, switch to a UV/visible tracking mode. The pointer may be configured with an additional UV/visible source as described above to counter these more sophisticated missiles.

When directed to perform a BIT, the roll/nod gimbal slews to the edge of its FOR. The IR laser fires a laser beam that passes through the fiber to the telescope where the beam is emitted. The light pipe intercepts a portion of the beam to create a virtual object in the receiver telescope's FOV. The electronics process the signals from the FPA to perform one or more tests including on/off, radiometry and boresight verification.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An optical transceiver, comprising:
   a platform;
   a transmitter including a source and transmitter optics on the platform that emits an optical beam collimated to one-quarter wave or less that diverges in a transmitter field-of-view (FOV);
   a receiver including a detector and receiver optics on the platform that detects optical radiation in a receiver FOV;
   a light pipe on the platform, said light pipe comprising,
      an input face and first reflective surface in the transmitter FOV to intercept a portion of the beam along a first axis and re-direct the beam;
      a second reflective surface and output face in the receiver FOV that re-directs the portion of the beam along a second axis towards the receiver to create a virtual object in the receiver FOV; and
      an optical channel that guides the redirected portion of the beam from the first reflective surface to the second reflective surface to offset the second axis from the first axis; and
   a processor that processes a signal generated by the receiver in response to the virtual object to perform one or more built-in tests (BIT) on the transceiver.

2. The optical transceiver of claim 1, wherein said transmitter FOV and receiver FOV do not overlap at a position on the platform and wherein said transmitter FOV and receiver FOV do overlap at a target range from the platform, said light pipe on the platform at the position the transmitter FOV and receiver FOV do not overlap.

3. The optical transceiver of claim 1, wherein the first and second reflective surfaces comprise total internal reflection (TIR) surfaces.

4. The optical transceiver of claim 1, wherein the light pipe has an acceptance FOV that maintains the collimation of the beam as it passes there through.

5. The optical transceiver of claim 1, further comprising:
   a diffuser on the output face that homogenizes the beam to increase the size of the virtual object in the receiver FOV.

6. The optical transceiver of claim 5, wherein the diffuser comprises an array of micro lenses.

7. The optical transceiver of claim 1, wherein the light pipe comprises first and second roof prisms separated by the optical channel.

8. The optical transceiver of claim 1, wherein the light pipe intercepts and re-directs less than 5% of the transmitted beam.

9. The optical transceiver of claim 1, wherein the light pipe is fixed to continuously sample the transmitted beam.

10. The optical transceiver of claim 1, wherein the processor initiates a BIT, further comprising:
a mechanism responsive to the initiation of a BIT to cause the light pipe to intercept and redirect the portion of the beam to create the virtual object in the receiver FOV.

11. The optical transceiver of claim 10, wherein the mechanism comprises a translation stage that moves the light pipe into position to intercept and redirect the portion of the beam to create the virtual object in the receiver FOV to perform the BIT and moves the light pipe to another position out of the transmitter's and receiver's FOV.

12. The optical transceiver of claim 10, wherein the light pipe is fixed in the transmitter and receiver FOV and said transmitter emits the optical beam with a first polarization, said mechanism comprises:
a beam splitter at the first reflective surface that transmits the first polarization and reflects a second polarization; and
a electro-optic modulator on the input face, said modulator ordinarily configured to pass the portion of the beam through the beam splitter to remain part of the optical beam, said modulator responsive to the initiation of the BIT to impart the second polarization on the incident portion of the beam to reflect off of the beam splitter.

13. The optical transceiver of claim 10, further comprising a second beam splitter on the second reflective surface that transmits the first polarization and reflects the second polarization.

14. The optical transceiver of claim 10, wherein the mechanism comprises a gimbal on which said transmitter optics and receiver optics are mounted, said light pipe is fixed to the platform off-gimbal at an edge of a field of regard (FOR), said gimbal response to BIT initiation to slew to the edge of the FOR whereby the light pipe intercepts the portion of the transmitted optical beam and redirects it to form the virtual object in the receiver FOV to perform the BIT.

15. The optical transceiver of claim 14, wherein the gimbal points an optical axis, said receiver optics lie along the optical axis and said transmitter optics are offset from the optical axis but nominally aligned with the line-of-sight of the optical receiver so that their FOV overlap at the target range, wherein said receiver detects passive IR radiation and wherein said transmitter emits a modulated IR beam.

16. The optical transceiver of claim 14, wherein the transmitter and receiver optics comprise a beam combiner that combines the transmitter and receiver FOV so that the FOV are co-boresighted at a common aperture along an optical axis.

17. The optical transceiver of claim 16, wherein the beam combiner creates a dead spot in the receiver FOV at the common aperture, said light pipe positioned in front of the beam combiner to intercept the optical beam in the dead spot and redirect it to form the virtual object in the receiver FOV.

18. The optical transceiver of claim 1, wherein the processor processes the signal generated by the receiver in response to the virtual object to perform a first test to determine if the transmitter is emitting the beam, a second test to measure power of the emitted beam and a third test to measure an alignment error of the transmit beam to the receiver FOV.

19. The optical transceiver of claim 1, wherein the light pipe is an integral total internal reflection (TIR) optical element comprising first and second roof prisms separated by the optical channel, said light pipe having an acceptance FOV that maintains the collimation of the beam as it passes there through, further comprising a diffuser on the output face that homogenizes the beam to increase the size of the virtual object in the receiver FOV.

20. An optical transceiver, comprising:
a platform;
a transmitter on the platform that emits an optical beam collimated to one-quarter wave or less that diverges in a transmitter field-of-view (FOV);
a receiver on the platform that detects optical radiation in a receiver FOV;
wherein said transmitter FOV and receiver FOV do not overlap at a position on the platform and wherein said transmitter FOV and receiver FOV do overlap at a target range from the platform;
a light pipe on the platform at the position the transmitter FOV and receiver FOV do not overlap, said light pipe comprising,
an input face and first reflective surface in the transmitter FOV to intercept a portion of the beam along a first axis and re-direct the beam;
a second reflective surface and output face in the receiver FOV that re-directs the portion of the beam along a second axis towards the receiver to create a virtual object in the receiver FOV;
an optical channel that guides the redirected portion of the beam from the first reflective surface to the second reflective surface to offset the second axis from the first axis;
a diffuser at the output face that homogenizes the beam to increase the size of the virtual object in the receiver FOV
wherein said light pipe has an acceptance FOV that maintains the collimation of the beam as it passes there through;
a mechanism that during ordinary operation of the transceiver causes the light pipe to not intercept the portion of the beam and that in response to a BIT request causes the light pipe to intercept the portion of the beam; and
a processor that issues the BIT request and processes a signal generated by the receiver in response to the virtual object to perform one or more built-in tests (BIT) on the transceiver that at least measure the power of the emitted beam and measure an alignment error of the transmit beam to the receiver FOV.

21. An optical transceiver, comprising:
a platform;
a roll/node gimbal on the platform that rotates about roll and nod axes to point an optical axis over a field-of-regard (FOR) in a multi-dimensional space;
receiver optics on the roll/nod gimbal that receive optical radiation in a receiver FOV along the optical axis;
a detector optically coupled to the receiver optics, said detector configured to detect radiation to track a target during normal operation;
a laser that emits a beam;
transmitter optics on the roll/nod gimbal optically coupled to the laser to transmit the optical beam collimated to one-quarter wave or less that diverges in a transmitter FOV that overlaps with the receiver FOV at a target range;
a light pipe fixed to the platform near the edge of the FOR, said roll/nod gimbal responsive to a built-in-test (BIT) request to slew the optical axis to the edge of the FOR so that the light pipe that intercepts a portion of the beam and re-directs it to create a virtual object in the receiver FOV; and a processor that processes a signal generated by the detector to track the target during normal operation and initiates the BIT request and processes a signal generated by the detector in response to the virtual object to perform one or more built-in tests (BIT) on the transceiver.

22. The optical transceiver of claim 21, wherein the light pipe comprises:
an input face and first reflective surface in the transmitter FOV to intercept and re-direct the portion of the beam;
a second reflective surface and output face in the receiver FOV that re-direct the portion of the beam to create the virtual object; and
an optical channel that guides the portion of the beam from the first reflective surface to the second reflective surface.

23. The optical transceiver of claim 22, wherein the first and second reflective surfaces comprise total internal reflection (TIR) surfaces.

24. The optical transceiver of claim 22, wherein the light pipe has an acceptance FOV that maintains the collimation of the beam as it passes there through.

25. The optical transceiver of claim 22, further comprising:
a diffuser on the output face, said diffuser comprising a microlens array that homogenizes the beam to increase the size of the virtual object in the receiver FOV.

26. The optical transceiver of claim 22, wherein the light pipe intercepts and re-directs less than 5% of the transmitted beam.

27. The optical transceiver of claim 22, wherein the processor processes the signal generated by the receiver in response to the virtual object to perform a first test to determine if the transmitter is emitting the beam, a second test to measure power of the emitted beam and a third test to measure an alignment error of the transmit beam to the receiver FOV.

28. The optical transceiver of claim 22, wherein the light pipe is an integral total internal reflection (TIR) optical element comprising first and second roof prisms separated by the optical channel, said light pipe having an acceptance FOV that maintains the collimation of the beam as it passes there through, further comprising a diffuser on the output face that homogenizes the beam to increase the size of the virtual object in the receiver FOV.

29. An optical transceiver, comprising:
a platform;
a roll/node gimbal on the platform that rotates about roll and nod axes to point an optical axis over a field-of-regard (FOR) in a multi-dimensional space;
receiver optics on the roll/nod gimbal that receive optical radiation in a receiver FOV along the optical axis;
a detector optically coupled to the receiver optics, said detector configured to detect passive IR radiation;
a laser that emits an IR beam;
transmitter optics on the roll/nod gimbal offset from the optical axis but nominally aligned with the line-of-sight of the optical receiver, said transmitter optics optically coupled to the laser to transmit the optical beam collimated to one-quarter wave or less that diverges in a transmitter FOV;
a total internal reflection (TIR) light pipe fixed to the platform near the edge of the FOR, said roll/nod gimbal responsive to a built-in-test (BIT) request to slew the optical axis to the edge of the FOR so that the light pipe intercepts a portion of the beam and re-directs it to create a virtual object in the receiver FOV, said light pipe having an acceptance FOV that maintains the collimation of the beam as it passes there through and a diffuser that an output face that homogenizes the beam to increase the size of the virtual object in the receiver FOV; and
a processor that processes a signal generated by the detector to track the target and controls the laser to modulate the IR beam to jam an IR seeker on the target, said processor initiates the BIT request and processes a signal generated by the receiver in response to the virtual object to perform a built-in test (BIT) on the transceiver including a measurement of the beam power and a measurement of an alignment error of the transmit beam to the receiver FOV.

* * * * *